United States Patent
Bixler et al.

(10) Patent No.: US 7,239,329 B2
(45) Date of Patent: Jul. 3, 2007

(54) BRUSH TEXTURE SIMULATING APPARATUS AND METHOD

(75) Inventors: Craig S. Bixler, Saint Charles, IL (US); Ping Li, Naperville, IL (US); David W. Brown, Aurora, IL (US)

(73) Assignee: Edwards Systems Technology, Inc., Cheshire, CT (US)

( * ) Notice: Subject to any disclaimer, the term of this patent is extended or adjusted under 35 U.S.C. 154(b) by 239 days.

(21) Appl. No.: 10/968,156

(22) Filed: Oct. 20, 2004

(65) Prior Publication Data

US 2006/0082589 A1   Apr. 20, 2006

(51) Int. Cl.
*G09G 5/00* (2006.01)
*G09G 5/02* (2006.01)
*G06F 9/00* (2006.01)
G06F 3/00 (2006.01)
G06F 17/00 (2006.01)

(52) U.S. Cl. .................. 345/629; 345/589; 345/617; 345/619; 715/764; 715/781

(58) Field of Classification Search ........... 345/421, 345/426, 428, 581, 589, 593, 597, 600, 619, 345/629, 63, 617, 582; 715/764, 781, 700; 382/162–167; 348/582, 584, 587, 599
See application file for complete search history.

(56) References Cited

U.S. PATENT DOCUMENTS

| | | | | |
|---|---|---|---|---|
| 4,642,683 | A | * | 2/1987 | Alkofer .................. 358/522 |
| 6,385,351 | B1 | * | 5/2002 | Simske et al. ............ 382/312 |
| 2003/0048277 | A1 | * | 3/2003 | Maillot et al. ............ 345/582 |
| 2005/0275626 | A1 | | 12/2005 | Mueller et al. ............ 345/156 |

\* cited by examiner

*Primary Examiner*—Wesner Sajous
(74) *Attorney, Agent, or Firm*—Baker & Hostetler LLP

(57) ABSTRACT

Techniques for superimposing highlights and shadows onto a background in order to simulate a brush texture graphical style within a software application's component window. The techniques include decoding a user-selected base-color into its individual color components, performing a contrast operation on the individual color components to determine highlight and shadow colors, and superimposing the highlight and shadow colors onto the user selected background.

23 Claims, 3 Drawing Sheets

BRUSH TEXTURE SIMULATING APPARATUS AND METHOD

FIELD OF THE INVENTION

The present invention relates generally to the field of graphical interfacing. More particularly, the present invention relates to an apparatus and method for superimposing highlights and shadows onto the background of a software application's component window in order to achieve a brush texture graphical style within the window.

BACKGROUND OF THE INVENTION

Many software applications today offer a single variable background color that can be set upon execution of the application. For example, the software application includes a color palette from which the user can select a background color. The application then applies the user-selected color to the background of the application's component window. The graphical style created by these single variable background color applications may not be responsive to the needs of users looking to create a unique graphical style for their software.

Unique graphical styles are effective marketing tools for software applications. Visibly different and aesthetically pleasing software applications standout and enable users to distinguish among different software applications. Also, unique graphics such as highlight and shadow lines, enable software designers to direct the user's eyes to specific locations and, thus, control where the user focuses his attention. Software applications implementing the foregoing technique may be easier to use and understand than software applications that offer only generic graphics.

Oftentimes, software designers use identifiable colors to direct the user's eyes to specific locations. However, using only identifiable colors may not direct color deficient users to specific locations because they may unable to identify certain colors. However, color deficient viewers may be able to identify lines created by highlight and shadow contrasts. Software designers may direct color deficient users to a specific location by using unique graphics such as highlight and shadow lines and, thus, make software applications easier to understand and use.

Accordingly, it is desirable to provide a new apparatus and method for creating and superimposing highlights and shadows onto the background of software applications' component windows and, thus, creating a brush texture graphical style within the windows. Using this apparatus and method, software designers can offer a graphical style that includes backgrounds having subtle to bold brush texture graphics superimposed thereon, rather than simply providing a flat background color. The present invention enables users to create unique graphical styles for their software.

SUMMARY OF THE INVENTION

The foregoing needs are met, to a great extent, by the present invention, wherein an apparatus and method are provided for superimposing highlights and shadows onto the background (base-color) of a software application's component window in order to produce a brush texture graphical style within the window. Using the apparatus and method, software designers can offer a graphical style that includes subtle to bold brush textures in the background, rather than simply providing a monochrome background.

In accordance with one aspect of the present invention, is a method for superimposing highlights and shadows onto a base-color that is displayed within a component window of a software application. The method comprises a first step of decoding a base-color to produce a plurality of color components. The method next includes the step of performing a contrast operation on the color components to determine at least a contrast color. The method then includes the step of superimposing the contrast color onto at least a portion of the base-color.

In accordance with another aspect of the present invention, an apparatus is provided for superimposing a plurality of highlights and shadows onto a base-color that is displayed within a component window of a software application. The apparatus comprises a decoding device configured to decode a base-color to produce a plurality of color components, a contrasting device configured to perform a contrast operation on the color components to determine at least a contrast color, and a superimposing device configured to superimpose the contrast color onto at least a portion of the base-color.

In accordance with yet another aspect of the present invention, a system is provided for superimposing a plurality of highlights and shadows onto a base-color that is displayed within a component window of a software application. The system comprises a means for decoding a base-color to produce a plurality of color components, a means for contrasting the color components to determine at least a contrast color, and means for superimposing the contrast color onto the base-color.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
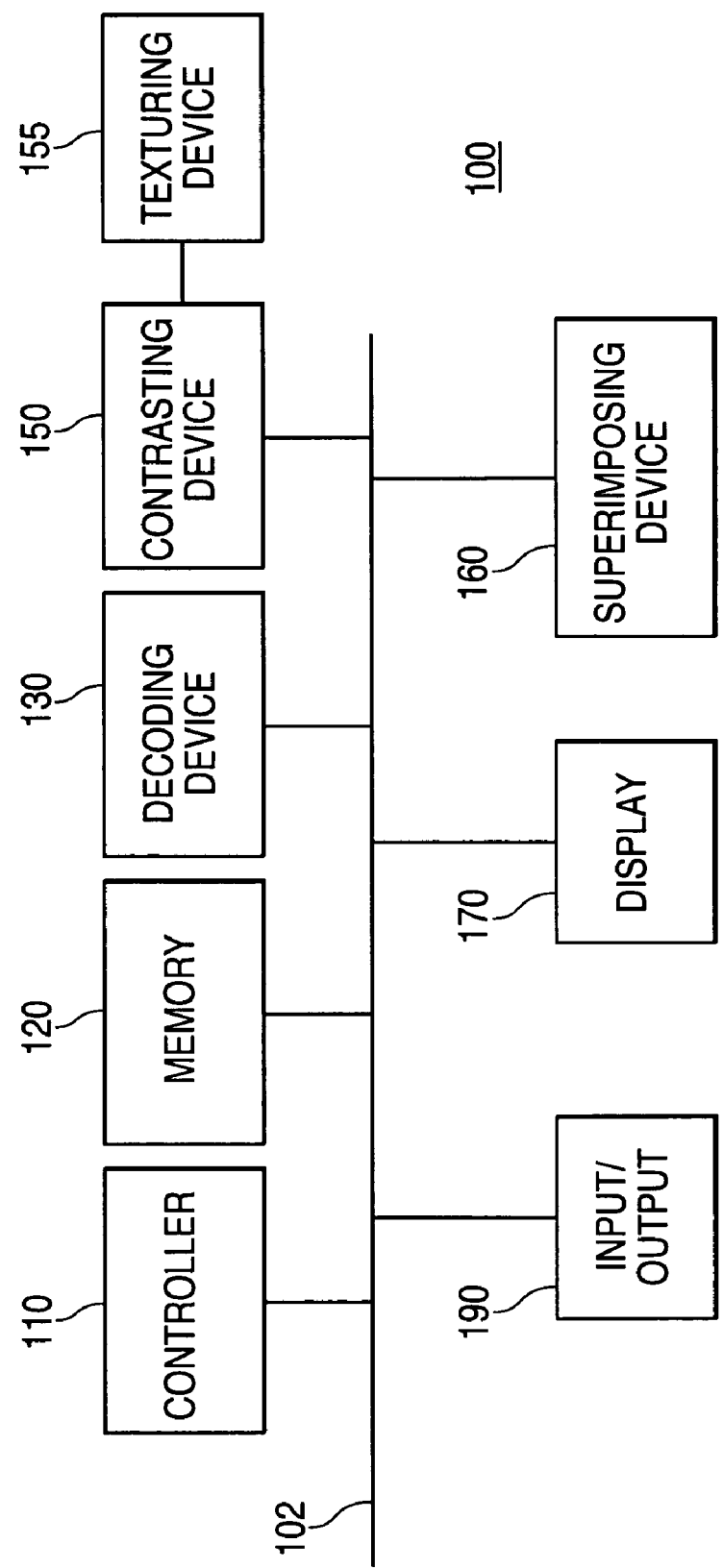
FIG. 1 is a block diagram of an apparatus capable of producing a brush texture graphical style within a software application's component window.

The invention will now be described with reference to the drawing figures, in which like reference numerals refer to like parts throughout. The present invention provides an apparatus and method for superimposing highlights and shadows onto the background of a software application's component window in order to create a brush texture graphical style within the window. Using the apparatus and method, software designers can offer a graphical style that includes subtle to bold brush textures in the background, rather than simply providing a monochrome background. By adding brush texturing users can create a unique graphical style for their software.

FIG. 1 is an exemplary graphical interfacing device 100 according to the disclosed apparatus and method. As shown in FIG. 1, the exemplary graphical interfacing device 100 includes a controller 110, a memory 120, a decoding device 130, a contrasting device 150, a texturing device 155, a superimposing device 160, a display 170, and an input/output device 190. The above components 110–190 are coupled together by control/data bus 102.

Although the exemplary graphical interfacing device 100 of FIG. 1 uses a bused architecture, it should be appreciated that any other architecture may be used as is well known to those of ordinary skill in the art.

It should also be appreciated that some of the above-listed components can take the form of software/firmware routines residing in memory 120 capable of being executed by the controller 110. It should be understood that the functions of any or all of components 130–160 can be accomplished using object-oriented software, thus increasing portability, software stability, and a host of other advantages not available with non-object-oriented software.

In operation, an operator using the graphical interfacing device 100 can superimpose highlights and shadows onto the background of a software application's component window upon execution. For example, an operator can create a brush texture effect by superimposing lines of varying colors and positions onto the background of a software application's component window. Accordingly, such an operator can first access the controller 110, by way of the input/output device 190, where he may select a base-color (background) and the degree of texturing he wishes to superimpose onto the selected background. The degree of texturing, for example, can be the disparity between the superimposed lines' colors and the background's color. If the color disparity is slight, then the degree of texturing is subtle, and if the color disparity is significant, then the degree of texturing is less subtle and more bold. It should be appreciated that the particular tools and techniques used to select a background and degree of texturing can vary from embodiment to embodiment as required or otherwise desired. Further, it should be appreciated that the graphical interfacing device 100 can import a background via the input/output device 190, instead of creating a background.

Figure 2:
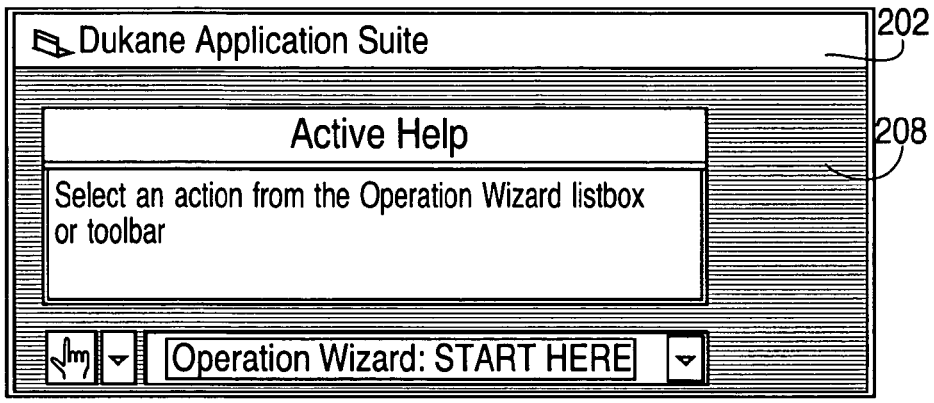
FIG. 2 depicts an exemplary component window having a degree of brush texturing produced therein.
Figure 3:
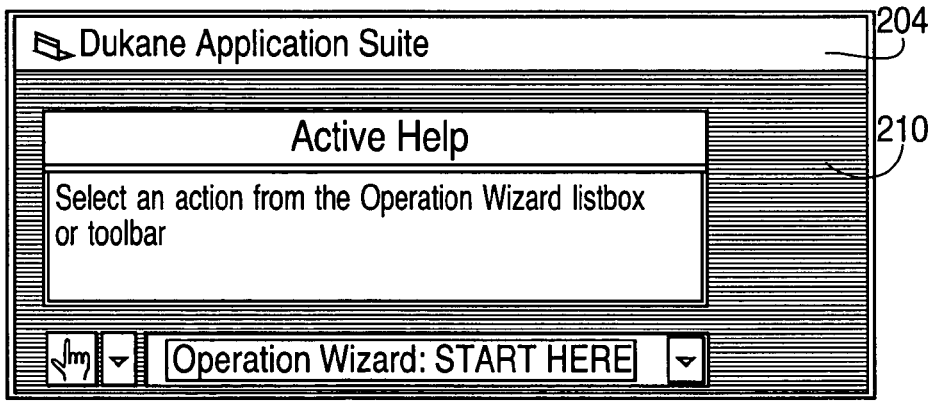
FIG. 3 depicts an exemplary component window having another degree of brush texturing produced therein.
Figure 4:
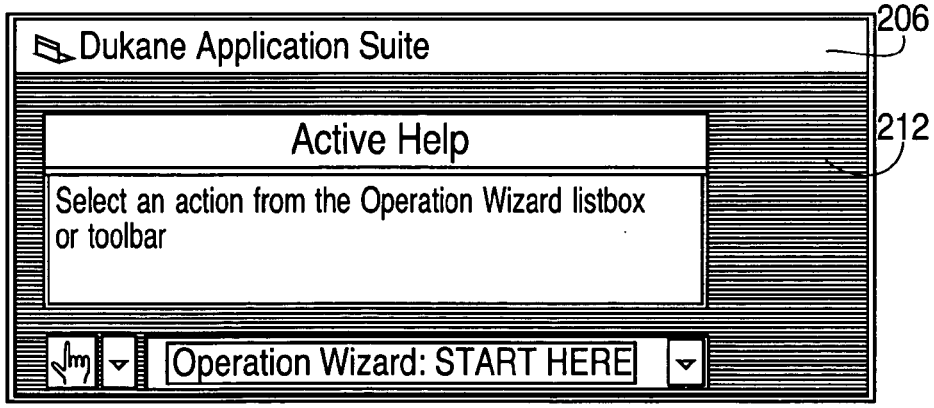
FIG. 4 depicts an exemplary component window having yet another degree of brush texturing produced therein.

FIGS. 2–4 depict exemplary component windows 202, 204, 206 having varying degrees of brush texturing 208, 210, 212 applied thereto in order to aid in the understanding of the disclosed apparatus and method. As shown in FIGS. 2–4, the exemplary component windows 202, 204, 206 depict varying degrees of brush texturing 208, 210, 212. The graphical interfacing device 100 creates the brush texturing 208, 210, 212 by superimposing horizontal lines of varying colors onto the user-selected background. The color disparity between the superimposed lines' colors and the background's color is subtle in 208, more distinct in 210, and bold in 212. In the exemplary graphical interfacing device 100, a texturing device 155 is located within the contrasting device 150. The texturing device 155, in part, controls the above described color disparity. The above mentioned color disparity can also be referred to as the degree of texturing.

Returning to FIG. 1, after the controller 110 has provided a background, the graphical interfacing device 100 accesses the decoding device 130, where it decodes the background. In the exemplary device 100, the decoding device 130 determines the red, green, and blue component values ("the RGB values") of the background. The RGB values, in the exemplary embodiment, include a hexadecimal number combination of 8-bit red, 8-bit green, and 8-bit blue.

It should be appreciated that the particular tools and techniques used to decode the background can vary from embodiment to embodiment as required or otherwise desired. Further, it should be appreciated that, instead of determining the RGB values, the graphical interfacing device 100 can optionally import the RGB values via the input/output device 190. It should also be appreciated that the graphical interfacing device 100 may be applied to backgrounds having color components other than 24-bit RGB colors.

Once the decoding device 130 has determined the respective values of background's color components, the graphical interfacing device 100 then access the contrasting device 150. The contrasting device 150 utilizes the values of the background's color components, as determined by the decoding device 130, to determine highlight and shadow color component step values. The contrasting device 150 adds the respective highlight color component step values to the respective values of the background's color components to determine the actual highlight colors that are to be superimposed onto the background. The contrasting device 150 subtracts the respective shadow color component step values from the respective values of the background's color components to determine the actual shadow colors that are to be superimposed onto the background.

To calculate the highlight component step values, for example, the contrasting device 150 determines the difference between the value of white, which is 255, and each of the respective values of the background's color components, and then multiplies the foregoing differences by a highlight factor. An example highlight component step value algorithm is outlined below:

```
//----------------------------------------------------------------//
Highlight Red Step Value = (255-Red Component) * Highlight Factor
Highlight Green Step Value = (255-Green Component) * Highlight Factor
Highlight Blue Step Value = (255- Blue Component) * Highlight Factor
//----------------------------------------------------------------//
```

To calculate the shadow component step values, the contrasting device 150 multiplies each of the respective values of the background's color components by a shadow factor. An example shadow component step value algorithm is outlined below:

```
//--------------------------------------------------------------//
    Shadow Red Step Value = Red Component * Shadow Factor
    Shadow Green Step Value = Green Component * Shadow Factor
    Shadow Blue Step Value = Blue Component * Shadow Factor
//--------------------------------------------------------------//
```

The highlight and shadow color component step values are directly proportional to the highlight and shadow factors and, thus, the larger the highlight and shadow factors, then the larger the highlight and shadow color component step values. On the other hand, the smaller the highlight and shadow factors, then the smaller the highlight and shadow color component step values.

In the exemplary embodiment, the contrasting device 150 can assign, for example, a highlight factor of $\frac{1}{16}$ or $\frac{1}{64}$. If the $\frac{1}{16}$ highlight factor is assigned, the resulting highlight color component step values are four times larger than if the $\frac{1}{64}$ highlight factor is assigned because the highlight color component step values are directly proportional to the highlight factor and $\frac{1}{16}$ is four times larger than $\frac{1}{64}$. If the background is extremely bright, the highlight color component step value is desirably significant enough to produce highlight color that is noticeable when superimposed onto the bright background. Thus, when the background is extremely bright, the larger highlight factor, $\frac{1}{16}$, is applied in order to produce highlight color component step values large enough to create a noticeable contrast between the background and the highlight colors superimposed thereon.

In the exemplary embodiment, the contrasting device 150 determines whether the background is extremely bright based on the respective values of the background's color components, as determined by the decoding device 130. For example, if all of the respective RGB values are within 64 increments of the value of white, which is 255, the contrasting device 150 assigns a highlight factor of $\frac{1}{16}$ because the background is extremely bright. Simply put, if all of the background's RGB values are 191 or above, the background is considered extremely bright and, thus, the contrasting device 150 assigns a highlight factor of $\frac{1}{16}$. However, if at least one of the RGB values is not within 64 increments of the value of white, the contrasting device 150 assigns a highlight factor of $\frac{1}{64}$ because the background is not considered extremely bright. Therefore, if at least one of the background's RGB values is below 191, the background is not considered extremely bright and, thus, significant step values are not needed in order to produce a noticeable highlight color. Therefore, the contrasting device 150 assigns the smaller highlight factor, $\frac{1}{64}$. An example highlight factor algorithm is outlined below:

```
//--------------------------------------------------------------//
If (Red Component or Blue Component or Green Component) < 191 Then
Highlight Factor =1/64
If (Red Component and Blue Component and Green Component) > 191
Then Highlight Factor =1/16
//--------------------------------------------------------------//
```

Also in the exemplary embodiment, the contrasting device 150 can assign, for example, a shadow factor of $\frac{1}{16}$ or $\frac{1}{64}$. If the $\frac{1}{16}$ shadow factor is assigned, the resulting shadow color component step values are four times larger than if the $\frac{1}{64}$ shadow factor is assigned because the shadow color component step values are directly proportional to the shadow factor and $\frac{1}{16}$ is four times larger than $\frac{1}{64}$. If the background is extremely dark, the shadow color component step values are desirably significant enough to produce shadow colors that are noticeable when superimposed onto the dark background. Thus, when the background is extremely dark, the larger factor, $\frac{1}{16}$, is applied in order to produce shadow color component step values large enough to create a noticeable contrast between the background and the shadow colors superimposed thereon.

The contrasting device 150 determines whether the background is extremely dark based on the background's individual component values, as determined by the decoding device 130. For example, the contrasting device 150 will assign a shadow factor of $\frac{1}{16}$ if all of the background's RGB values are within 64 increments of the value of black, which is 0. Thus, if all of the background's RGB values are 64 or below, the contrasting device 150 assigns the larger shadow factor of $\frac{1}{16}$. However, the contrasting device 150 will assign the smaller shadow factor of $\frac{1}{64}$ if at least one of the background's RGB values is more than 64 increments from the value of black. In other words, if at least one of the background's RGB values is above 64, the applicable shadow factor is set at the smaller $\frac{1}{64}$. An example shadow factor algorithm is outlined below:

```
//--------------------------------------------------------------//
If (Red Component or Blue Component or Green Component) > 64 Then
Shadow Factor =1/64
If (Red Component and Blue Component and Green Component) < 64
Then Shadow Factor =1/16
//--------------------------------------------------------------//
```

The operator can access the controller 110, where he can provide the texturing device 155 with a texturing factor. The texturing factor, like the highlight and shadow factors, is directly proportional to the highlight and shadow color component step values and, thus, the larger the texturing factor, then the larger the highlight and shadow color component step values and the higher the degree of texturing. On the other hand, the smaller the texturing factor, then the smaller the highlight and shadow color component step values. As distinguished from the contrasting device's 150 automated control of the highlight and shadow factors, the texturing device 155 enables the operator to manually adjust the highlight and shadow component step values by determining the texturing factor and, thereby, the operator can manually adjust the degree of texturing.

In the exemplary device 100, the contrasting device 150 determines a specific highlight and shadow color component step value for each of the background's respective color components. These specific step values are determined and applied so that the highlight lines' respective color components approach white in synch with each other, and the shadow lines' respective color components approach black in synch with each other. It should be appreciated that in an alternative embodiment, a common step value may be determined and applied to all of the background's respective color components. This common step value arrangement can result in, for example, a single color component of a highlight line approaching the value of white much faster than the other color components that compose the highlight line and, thus, resulting in a highlight line having a different overall color than the background, rather than the desired brighter highlight line having the same overall color as the background.

Once the contrasting 150 device has determined the highlight and shadow step values, the superimposing device 160 superimposes horizontal, vertical, or diagonal lines at semi-regular intervals onto the user-selected background. In the exemplary device 100, the RGB values of the superimposed highlight lines are one and two highlight component step values higher than the RGB values of the user-selected background. Also in the exemplary device 100, the RGB values of the superimposed shadow lines are one and two shadow component step values lower than the RGB values of the user-selected background. The superimposing device 160 superimposes an equal number of one step highlights and shadows and an equivalent number of two step highlights and shadows. Thus, the graphical interfacing device 100 can apply highlights and shadows without altering the overall color of the user-selected background.

The exemplary superimposing device 160 arranges the highlight and shadow colors into lines having like color and a width of, for example, one pixel, wherein a pixel is the smallest discrete component of an image or picture on the display 170. The superimposing device 160 contiguously arranges lines of different colors in order to maintain a consistent brush texture throughout the software application's component window.

For example, to accomplish the foregoing line arrangement, the superimposing device 160 divides each component window into sections. Each section has sixteen horizontal lines, and each line has a one pixel width. Within each section, the superimposing device 160 superimposes three non-contiguous highlight lines having a highlight component step value of one and three non-contiguous shadow lines having a shadow component step value of one. The device 160 also superimposes two non-contiguous highlight lines having a highlight step value of two and two non-contiguous shadow lines having a shadow step value of two. Thus, ten of the sixteen lines within each section are superimposed with either a highlight or shadow color. The remaining six non-contiguous lines are not assigned a step value and, thus, remain the user-selected background color. An example superimposing algorithm is outlined below:

```
//----------------------------------------------------------------//
Lines 0, 6, 12 = One Step Highlight Line(Red Component + (1* Highlight Red
Step Value), Blue Component + (1* Highlight Blue Step Value), Green
Component + (1* Highlight Green Step Value))
Lines 1, 5, 10 = One Step Shadow Line(Red Component – (1* Shadow Red Step
Value), Blue Component – (1* Shadow Blue Step Value), Green Component – (1* Shadow
Green Step Value))
Lines 2, 8 = Two Step Highlight Line(Red Component + (2* Highlight Red Step
Value), Blue Component + (2* Highlight Blue Step Value), Green Component +
(2* Highlight Green Step Value))
Lines 7, 13 = Two Step Shadow Line(Red Component – (2* Shadow Red Step
Value), Blue Component – (2* Shadow Blue Step Value), Green Component – (2* Shadow
Green Step Value))
//----------------------------------------------------------------//
```

Figure 5:
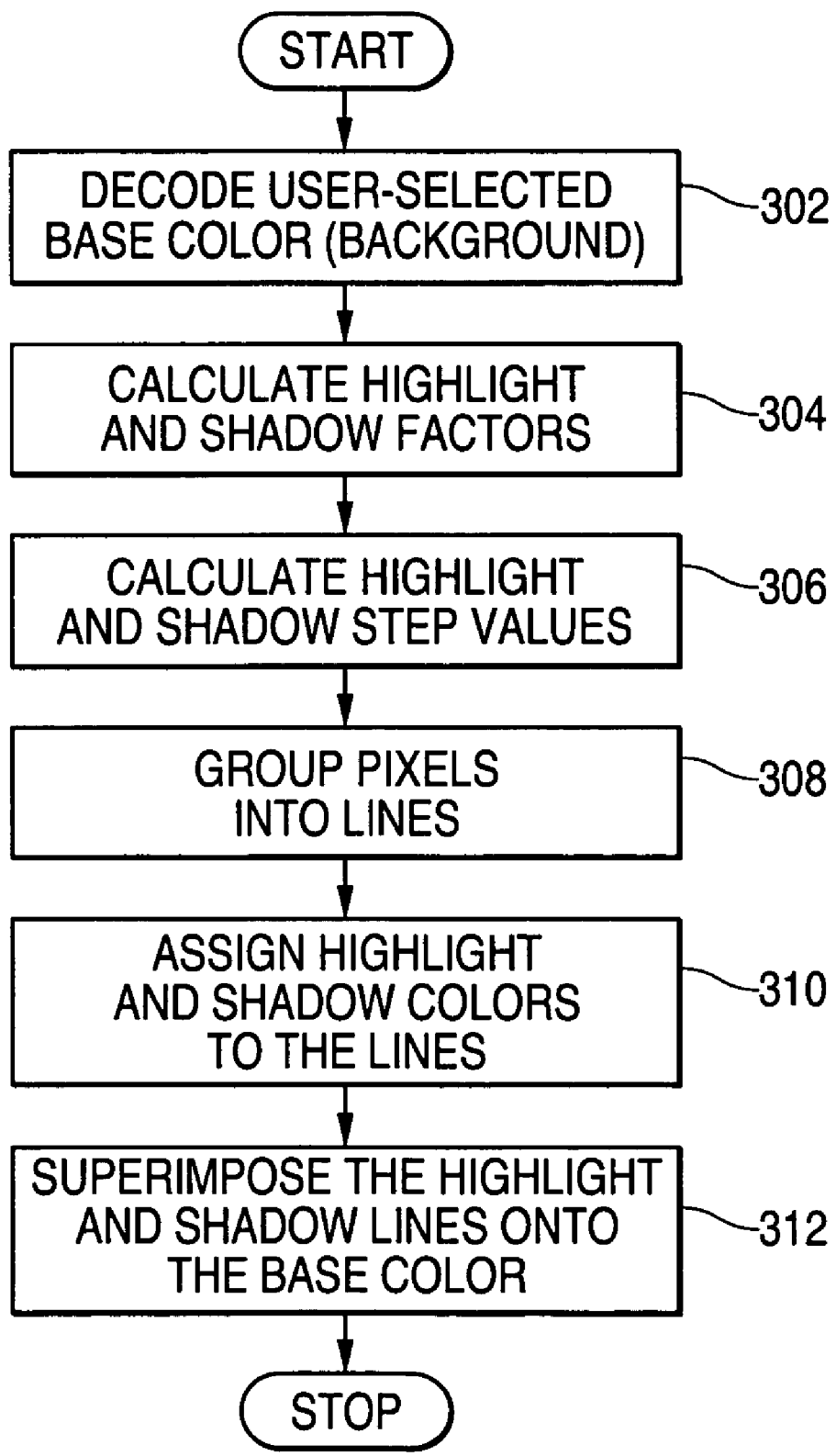
FIG. 5 is a flowchart outlining an exemplary operation for simulating a brush texture graphical style within a software application's component window.

FIG. 5 is a flowchart outlining an exemplary operation according to the present disclosure for simulating a brush texture within a software application component window. The process starts at step 302 where the user-selected background is decoded into its individual color component values. Next, in step 304, highlight and shadow factors are calculated based on the individual component values. Then, in step 306 highlight and shadow step values are determined based on the factors and component values.

In step 308, pixels are grouped into lines. Next, in step 310 the lines are assigned varying highlight and shadow colors. The highlight and shadow colors are determined based on the step values obtained in step 306. Then, in step 312, the lines are superimposed onto the background.

While the various inventive aspects of this disclosure have been generally described with regard to two-dimensional systems, it should be appreciated that the disclosed methods and systems can be applicable for three dimensional analysis. Also while the various inventive aspects of this disclosure have been generally describe with regard to 24-bit RGB colors, it should be appreciated that the disclosed methods and systems can be applicable for colors of varying bits and components.

In various embodiments where the above-described systems and methods are implemented using a programmable device, such as a computer-based system or programmable logic, it should be appreciated that the above-described systems and methods can be implemented using any of the various known or later developed languages, such as "C", "C++", "C Sharp," "FORTRAN", "Pascal", "VHDL", "Visual Basic", "Visual Basic .NET", and the like.

Accordingly, various storage media, such as magnetic computer disks, optical disks, electronic memories, and the like, can be prepared to direct a device, such as a computer, to implement the above-described systems and methods. Once an appropriate device has access to the information and programs contained on the storage media, the storage media can provide the information and programs to the device, thus enabling the device to perform the above-described systems and methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and methods, implement the individual systems and methods, and coordinate the related functions of the individual systems and methods.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for superimposing highlights and shadows onto a base-color that is displayed within a component window of a software application, comprising:
    decoding the base-color to produce a plurality of color components, wherein decoding the base-color comprises calculating at least one base component value from a first subset n-bits of the base-color;
    performing a contrast operation on the color components to determine at least a contrast color; and
    superimposing the contrast color onto at least a portion of the base-color.

2. The method of claim 1, wherein the contrast color is at least a first highlight color and at least a first shadow color.

3. The method of claim 2, wherein the step of superimposing includes superimposing both the first highlight color and the first shadow color onto the base-color.

4. The method of claim 1, wherein the plurality of color components includes a red base component, a green base component, and a blue base component.

5. The method of claim 2, wherein the contrast operation determines at least two highlight colors.

6. The method of claim 2, wherein the contrast operation determines at least two shadow colors.

7. The method of claim 2, wherein the contrast operation determines at least two highlight colors and at least two shadow colors.

8. The method of claim 4, wherein decoding the base-color comprises:
    calculating the red base component value from a the first subset of n-bits of the base-color;
    calculating the green base component value from a second subset of n-bits of the base-color; and
    calculating the blue base component value from a third subset n-bits of the base-color.

9. An apparatus for superimposing a plurality of highlights and shadows onto a base-color that is displayed within a component window of a software application, comprising:
    a decoding device configured to decode the base-color to produce a plurality of color components by calculating at least one base component value from a first subset n-bits of the base-color;
    a contrasting device configured to perform a contrast operation on the color components to determine at least a contrast color; and
    a superimposing device configured to superimpose the contrast color onto at least a portion of the base-color.

10. The apparatus of claim 9, wherein the contrast color is at least a first highlight color and at least a first shadow color.

11. The apparatus of claim 10, wherein the superimposing device superimposes both the first highlight color and the first shadow color onto the base-color.

12. The apparatus of claim 9, wherein the plurality of color components includes a red base component, a green base component, and a blue base component.

13. The apparatus of claim 10, wherein the contrasting device determines at least two highlight colors.

14. The apparatus of claim 11, wherein the contrasting device determines at least two shadow colors.

15. The apparatus of claim 11, wherein the contrasting device determines at least two highlight colors and at least two shadow colors.

16. The apparatus of claim 10, wherein superimposing the contrast color onto the base-color comprises:
    superimposing a first highlight color, a second highlight color, a first shadow color, and a second shadow color onto the base-color.

17. A system for superimposing a plurality of highlights and shadows onto a base-color that is displayed within a component window of a software application in order, comprising:
    means for decoding the base-color to produce a plurality of color components, wherein the means for decoding the base-color comprises means for calculating at least one base component value from a first subset n-bits of the base-color;
    means for contrasting the color components to determine at least a contrast color; and
    means for superimposing the contrast color onto at least a portion of the base-color.

18. The system of claim 17, wherein the contrast color is at least a first highlight color and at least a first shadow color.

19. The system of claim 18, wherein the means for superimposing superimposes both the first highlight color and the first shadow color onto the base-color.

20. The system of claim 17, wherein the plurality of color components includes a red base component, a green base component, and a blue base component.

21. The system of claim 18, wherein the means for contrasting determines at least two highlight colors.

22. The system of claim 18, wherein the means for contrasting determines at least two shadow colors.

23. The system of claim 18, wherein the means for contrasting determines at least two highlight colors and at least two shadow colors.

* * * * *

UNITED STATES PATENT AND TRADEMARK OFFICE
CERTIFICATE OF CORRECTION

PATENT NO. : 7,239,329 B2 Page 1 of 1
APPLICATION NO. : 10/968156
DATED : July 3, 2007
INVENTOR(S) : Craig S. Bixler et al.

It is certified that error appears in the above-identified patent and that said Letters Patent is hereby corrected as shown below:

Column 9
Line 38, please replace "from a the" with --from the--.

Signed and Sealed this

Sixteenth Day of October, 2007

JON W. DUDAS
*Director of the United States Patent and Trademark Office*